United States Patent [19]

Mueller et al.

[11] Patent Number: 5,734,565
[45] Date of Patent: Mar. 31, 1998

[54] REDUCING SWITCHING LOSSES IN SERIES CONNECTED BRIDGE INVERTERS AND AMPLIFIERS

[75] Inventors: Otward M. Mueller, Shrewsbury; Richard J. Gran, Northborough, both of Mass.

[73] Assignee: American Superconductor Corporation, Westborough, Mass.

[21] Appl. No.: 698,943

[22] Filed: Aug. 16, 1996

[51] Int. Cl.⁶ .................................................. H02M 7/515
[52] U.S. Cl. .................................................. 363/132
[58] Field of Search .......................... 363/35–41, 64–66, 363/71–75, 115–116, 131–136

[56] References Cited

U.S. PATENT DOCUMENTS 4,674,024  6/1987  Paice et al. ............................. 363/71

OTHER PUBLICATIONS

Hudgens, J.L.; Godbold, C.V.; Portnoy, W.M.; and Mueller Otward M.; "Temperature Effects on GTO Characteristics"; Proceedings of the 29th IAS Annual Meeting; Oct. 2–7, 1994.
Lai, Jih–Sheng and Peng, Fang Zheng; "Multilevel Converters—A New Breed of Power Converters"; Conference Record of 1995 IEEE Industry Applications Conference 30th IAS Annual Meeting; Oct. 8–12, 1995; pp 2348–2356.
Mueller, Otward M. and Park J.N.; Quasi–Linear IGBT Inverter Technologies; Conference Proceedings of the Ninth Annual APEC Conference; 0–7803–1456–5/94 IEEE; 94CH3364–7; Feb. 13–17, 1994, pp. 253–259.
Robicon Technical Notes; Robicon's New Medium Voltage PWM Variable Frequence Drive—The 'Perfect Harmony' Series; Electric Maintenance Service Co., Inc., 143 Bennet Street, Bridgeport connecticut 06605; Apr., 1995.
Rosenbauer, F. and Lorenzen, H.W.; "Behaviour of IGBT Modules in the Temperature Range from 5 to 300 K"; Cryogenic Engineering Conference, Columbus Ohio, Paper TU–PE2b–1; Jul. 17–21, 1995.

Primary Examiner—Aditya Krishnan
Attorney, Agent, or Firm—Fish & Richardson P.C.

[57] ABSTRACT

A staggered-frequency AC inverter includes at least first and second pulse width modulated bridge circuits connected in series. The first bridge circuit receives a DC voltage and operates at a first pulse width modulated switch frequency to generate a first output corresponding to a first region of the AC signal. The second bridge circuit receives a DC voltage and operates at a second pulse width modulated switch frequency substantially lower than the first frequency. The second bridge circuit generates a second output corresponding to a second region of the AC signal in which the AC signal changes less rapidly than in the first region, minus a maximum voltage magnitude of the first region. Another aspect of the invention features a staggered-voltage multiple-phase circuit having at least a first-phase portion for generating a voltage signal in a first phase, and a second-phase portion for generating the voltage signal in a second phase. Each phase portion includes a first circuit that generates a first output corresponding to a plurality of segments of the voltage signal minus a corresponding plurality of constant values, and a second circuit connected in series with the first circuit that generates a second output corresponding to at least some of the plurality of constant values. Independent and isolated power supplies are connected to each first and second circuit in each of the first-phase and second-phase portions. Alternatively, an output transformer having first and second independent and isolated primary coils is connected to respective outputs of the first-phase and second-phase portions.

32 Claims, 5 Drawing Sheets

State Table

| State | Voltage | Bridge 25 Always PWM | Bridge 34 | Bridge 40 |
|---|---|---|---|---|
| 1 | 0 -100 | + | 0 | 0 |
| 2 | 100-200 | − | + | 0 |
| 3 | 200-300 | + | + | 0 |
| 4 | 300-400 | − | − | + |
| 5 | 400-500 | + | − | + |
| 6 | 500-600 | − | 0 | + |
| 7 | 600-700 | + | 0 | + |
| 8 | 700-800 | − | + | + |
| 9 | 800-900 | + | + | + |

REDUCING SWITCHING LOSSES IN SERIES CONNECTED BRIDGE INVERTERS AND AMPLIFIERS

BACKGROUND OF THE INVENTION

This invention relates to series-connected bridge inverters and amplifiers having low switching losses, and more particularly relates to staggering of frequencies in series-connected bridges and staggering of voltages in series-connected bridges.

H-bridge switch circuits connected to DC input voltages can serve as AC inverters or as amplifiers when controlled by a control circuit such as a pulse-width modulation circuit that appropriately modulates a fixed-frequency train of pulses that are applied to the switches in the circuit.

H-bridge switch circuits may be connected in series to achieve output voltages higher than can be produced by a single bridge circuit given the limitations of switches such as low-voltage cryo-MOSFETs. The bridge modules may be supplied with independent DC input voltages obtained by using a phase-shifting transformer to supply independent DC rectifiers. Each series-connected bridge can develop a voltage that is positive (e.g., upper-right and lower-left switches on), negative (e.g., upper-left and lower-right switches on), or zero (e.g., both upper or both lower switches on). Thus, if three series-connected bridges generate voltage $V_1$, $V_2$, and $V_3$ (either a fixed voltage corresponding to the DC bridge input or a lesser voltage obtained by pulse-width modulation of the bridge switches), the total output voltage signal V is given by $V=s_1V_1+s_2V_2+s_3V_3$, where $s_1$, $s_2$, and $s_3$, which depend on the switching configuration, are either ±1 or 0. If the series-connected bridges are used as an inverter to produce an AC output voltage, pulse-width modulation of the bridges occurs during different respective portions of the AC cycle.

A published article by Otward Mueller et al. entitled "Quasi-Linear IGBT Inverter Topologies," IEEE publication 0-7803-1456-5/94 [APEC-94], pp. 253–59, 1994, which is hereby incorporated in its entirety herein by reference, describes single-phase series-connected full bridge "staggered voltage" topologies. In these topologies the series-connected bridges receive DC input voltages that are stepped in the ratio 1:2:6:18 (the binary/ternary system), such that the total output voltage of the series-connected bridges can be x.V±2.V±6.V±18.V, where x is any number between −1 and 1, and V is the DC input voltage applied to the lowest-voltage bridge. Thus, only the lowest-voltage bridge need produce a rapidly changing output, while the other bridges alternate between three values (a positive constant value, a negative constant value, and zero). The same scheme can be utilized using ratios other than binary/ternary; for example, each bridge may receive the same DC input voltage.

SUMMARY OF THE INVENTION

One aspect of the invention features a staggered-frequency AC inverter or amplifier that includes at least first and second pulse width modulated bridge circuits connected in series with each other. The first bridge circuit receives a DC voltage and operates at a first pulse width modulated switch frequency to generate a first output corresponding to an AC signal in a first region of the AC signal (e.g., a region that includes the zero crossing of the signal). The second bridge circuit receives a DC voltage and operates at a second pulse width modulated switch frequency substantially lower than the first pulse width modulated switch frequency. The second bridge circuit generates a second output corresponding to the AC signal in a second region of the AC signal in which the AC signal changes less rapidly than in the first region (e.g., a region adjacent to the zero crossing region), minus a maximum voltage magnitude of the first region. Pulse width modulation circuitry modulates the first bridge circuit at the first pulse width modulated frequency to generate the first output when the AC signal is in the first region, and modulates the second pulse width modulated bridge circuit at the second pulse width modulated frequency to generate the second output when the AC signal is in the second region different from the first region.

Because the AC signal in the second region changes more slowly than in the first region, and because the ratio of any ripple in the AC signal (caused by slow switching) to the AC voltage itself is less in the higher voltage ranges in which the AC signal changes more slowly, the control circuit can operate the second bridge at a lower switching frequency than the first bridge, with reduced switching losses.

Another aspect of the invention features a staggered-voltage multiple-phase circuit (e.g., an AC inverter or an amplifier) having at least a first-phase portion for generating a voltage signal in a first phase, and a second-phase portion for generating the voltage signal in a second phase out of phase with the first phase (and preferably including a third-phase portion for generating the voltage signal in a third phase). The voltage signal is a predetermined AC output signal if the multiple-phase circuit is an AC inverter, or an amplification of an input signal if the multiple-phase circuit is an amplifier. Each phase portion includes a first circuit that generates a first output corresponding to a plurality of segments of the voltage signal minus a corresponding plurality of constant values, and a second circuit connected in series with the first circuit that generates a second output corresponding to at least some of the plurality of constant values (and each phase portion preferably includes a third series-connected circuit that generates additional constant values). The sum of the first output and the second output corresponds to at least a portion of the voltage signal. Control circuitry controls the first and second (and third) circuits so as to cause these circuits to generate the first and second (and third) outputs respectively. The second circuit (as well as the third circuit if present) is a full-bridge circuit that receives a DC voltage, and the first circuit may be a pulse-width modulated full-bridge circuit or a linear class-AB amplifier. Independent and isolated power supplies are connected to each first and second circuit in each of the first-phase and second-phase portions to supply DC voltage to the first and second circuits of the first-phase and second-phase portions. This avoids risk of short circuit between the first-phase and second-phase portions.

Another aspect of the invention feature a staggered voltage, multiple-phase circuit in which an output transformer having first and second independent and isolated primary coils is connected to respective outputs of the first-phase and second-phase portions of the multiple phase circuit to receive the voltage signal in the first phase generated by the first-phase portion and to receive the voltage signal in the second phase generated by the second-phase portion. By using such an output transformer it is possible to allow the input voltage to the first circuit in both the first-phase and second-phase portions of the multiple-phase circuit to be provided by a single common power supply, and to allow the input voltage to the second circuit in both the first-phase and second-phase portions of the multiple-phase circuit be provided by a single common power supply.

Another aspect of the invention implements the staggered-frequency circuit described above as a multiple-phase circuit having independent and isolated DC power supplies as described above or having an output transformer with independent and isolated primary phase coils as described above.

Numerous other features, objects, and advantages of the invention will become apparent from the following detailed description when read in connection with the accompanying drawings

DETAILED DESCRIPTION

Figure 1:
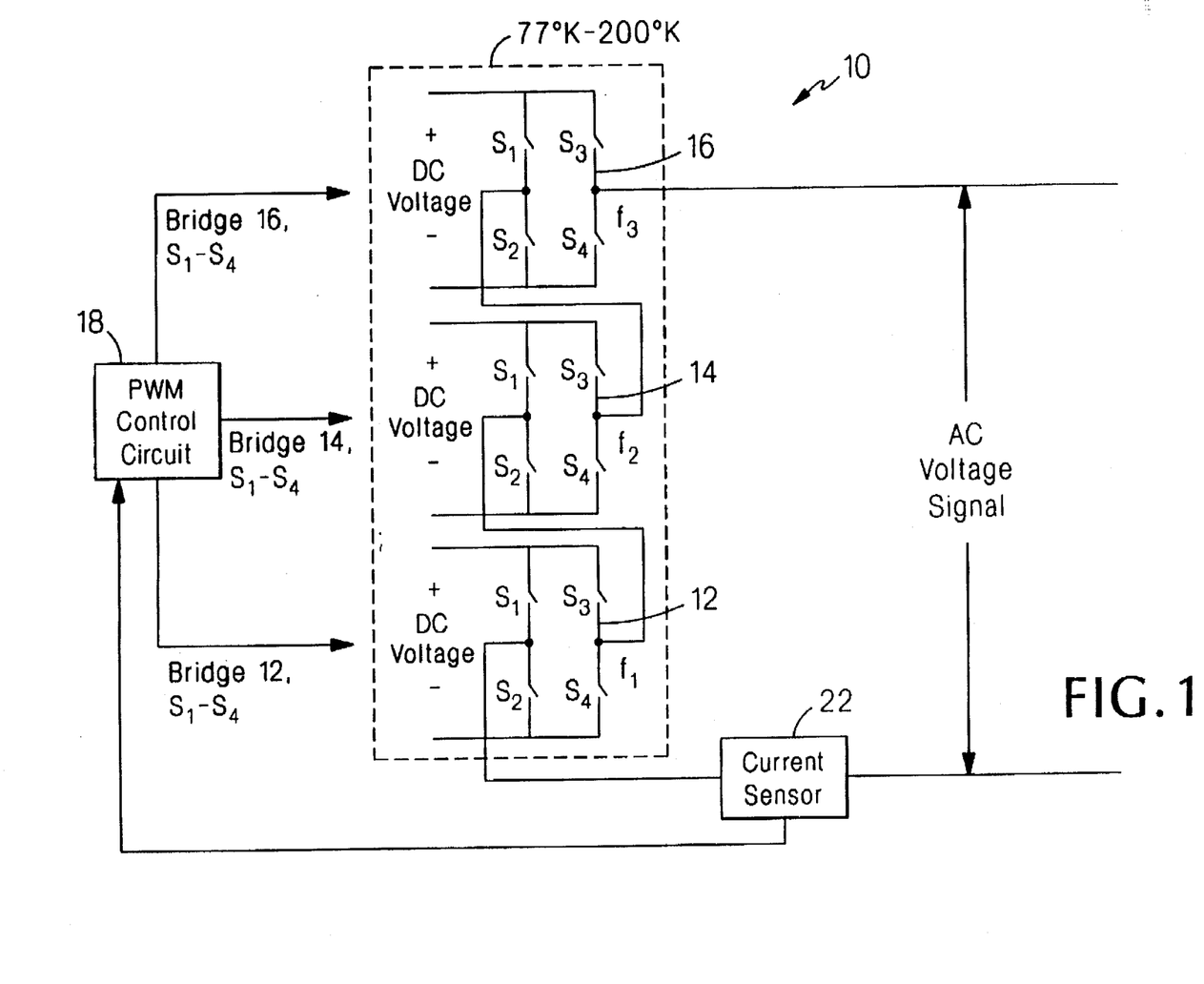
FIG. 1 is a block diagram of a staggered-frequency AC inverter or operational amplifier having series-connected full bridges in accordance with the invention.

With reference to FIG. 1, in staggered-frequency AC inverter or operational amplifier 10, full bridges 12, 14, and 16 are connected together in series and receive independent but equal DC voltage inputs, for example, 650 V. Each DC voltage is obtained from an AC voltage by means of a phase-shifting transformer. The output AC voltage signal of inverter or amplifier 10, which is applied through a load 20, is the sum of the outputs of the three bridges 12, 14, and 16. The switches $S_1$-$S_4$ of each bridge may be cryogenic-cooled MOSFETs or other suitable power devices (the term "MOSFET" as used herein includes devices such as BiMOSFETs). The switches are controlled by a control circuit 18 that pulse width modulates bridge 12 at a relatively high frequency $f_1$ such as 5 kHz, bridge 14 at a lesser frequency $f_2$ such as 3 kHz, and bridge 16 at an even lower frequency $f_3$ such as 1 kHz. Control circuit 18 receives a feedback signal from current sensor 22, which is in series with the load, so as to ensure proper control of the AC voltage signal by control circuit 18. It will be appreciated by those skilled in the art that standard filter circuits should be provided for each bridge circuit in FIG. 3 in order to filter out ripple due to pulse width modulation.

Although in one preferred embodiment switches $S_1$-$S_4$ of each bridge are cryogenically cooled below 230° K., preferably between 77° K. and 200° K., in other embodiments the switches may operate at room temperature. Also, although only three series-connected bridges are shown in FIG. 1, any number of such bridges, operating at differing frequencies, can be connected in series in accordance with the invention. For example, for an AC signal having an rms voltage of 2600 V or less, three bridges can be appropriate. For an AC voltage having an rms voltage of 4800 V or less, five bridges can be appropriate. The importance of cryogenically cooling the switches increases with the number of bridges that are connected in series.

Figure 2:
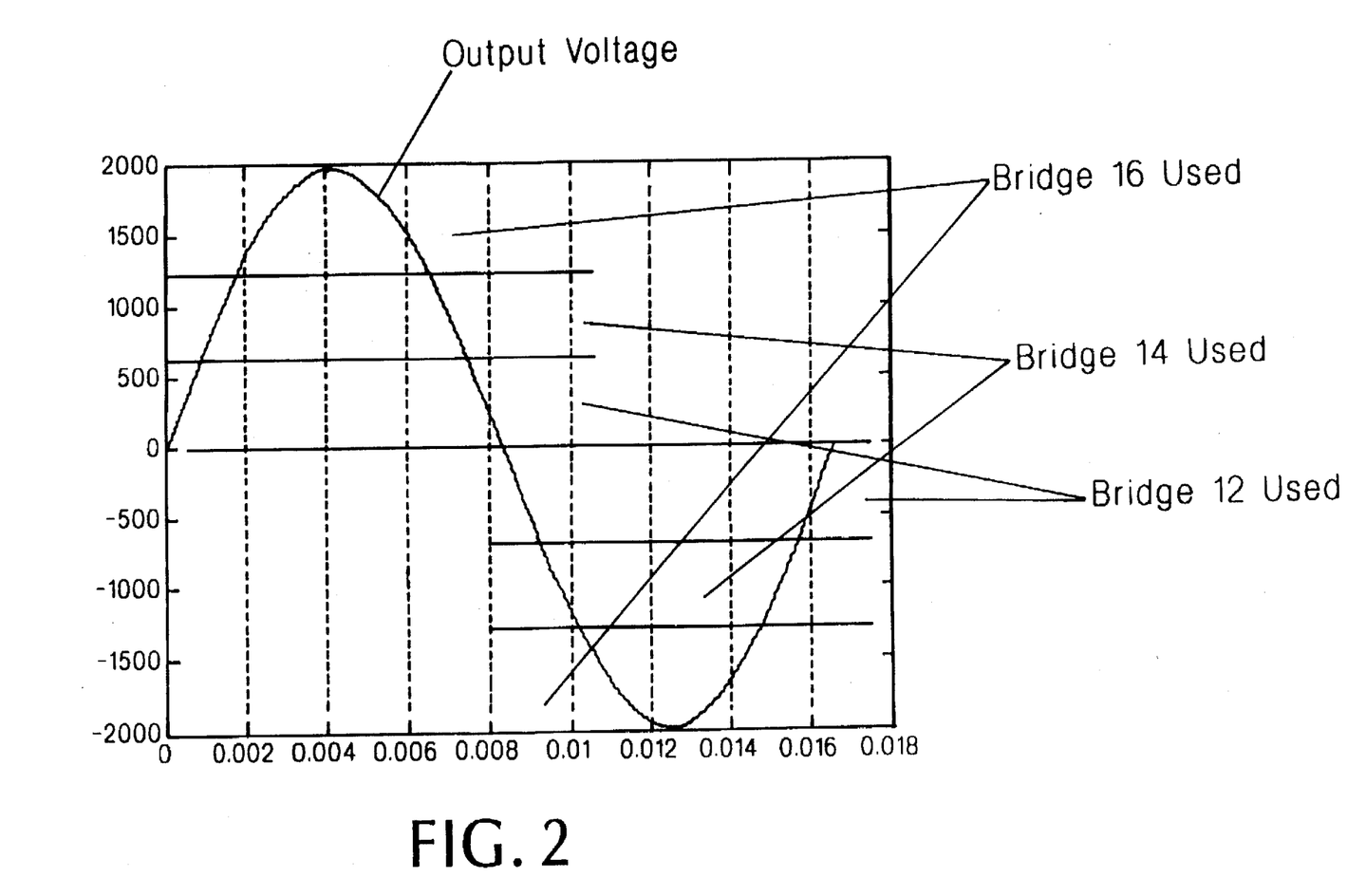
FIG. 2 is a diagram of the AC voltage signal produced by the staggered-frequency circuit of FIG. 1.

With reference to FIG. 2, the control circuit pulse width modulates bridge circuit 12 only during the portion of the AC voltage signal that is near the zero crossing, between −650 V and 650 V, so as to cause bridge circuit 12 to produce this portion of AC voltage signal while the other two bridge circuits contribute a voltage of zero. As soon as the AC voltage signal increases past 650 V or decreases below −650 V, the control circuit holds bridge circuit 12 at 650 V or −650 V by causing the appropriate pair of the switches in the bridge circuit to remain closed, while the control circuit pulse width modulates bridge circuit 14 during the portions of the AC voltage signal between 650 V and 1300 V and between −650 V and −1300 V. Similarly, as soon as the AC voltage signal increases past 1300 V or decreases below −1300 V, the control circuit holds each of bridge circuits 12 and 14 at 650 V or −650 V (for a total voltage of 1300 V or −1300 V), while the control circuit pulse width modulates bridge circuit 16 only during the portions of the AC voltage signal between 1300 V and 1950 V and between −1300 V and −1950 V. The phase-to-phase voltage across all three bridges is 2880 VAC (rms), or 480 VAC (rms) per H-bridge.

Because the AC voltage signal between 650 V and 1300 V and between −650 V and −1300 V changes more slowly than the AC voltage signal between −650 V and 650 V, and because the ratio of any ripple in the AC voltage signal (caused by slow switching) to the AC voltage signal itself is less in the higher voltage range than the voltage range near the zero crossing, the control circuit can operate bridge 14 at a lower switching frequency than bridge 12, which results in a reduction in overall switching losses. Similarly, the control circuit can operate bridge 16 at a lower frequency than bridge 14, with further reduced switching losses.

Moreover, the switching losses due the relatively frequent switching in bridge 12 are less than the switching losses that would occur if bridge 14 were pulsed at the same frequency, and similarly the switching losses in bridge 14 are less than they would be in bridge 16 if it were pulsed at the same frequency as bridge 14. This is because switching losses are proportional to frequency.

Thus, the staggered-frequency circuit of FIG. 1 provides very low switching losses for the entire series connection of bridges. This is especially important because in a cryogenic-cooled MOSFET power inverter or amplifier there is a trade-off between conduction losses and switching losses. In particular, conduction losses can be reduced to as small a value as desired by placing MOSFETs in parallel, but only at the expense of increased switching losses, which increase as a function of surface area of FETs.

If MOSFET switches are used in the bridges, then the lowest power dissipation bridge 16 need not be cooled as much as bridge 14, which need not be cooled as much as bridge 12. Thus it is possible to operate bridge 16 at a higher temperature level than bridge 14, which can be operated at a higher temperature level than bridge 12, in order to realize an improvement in overall cooling per liter of liquid nitrogen in a vapor cooling system with multiple temperature levels (all of which may be cryogenic temperature levels below about 200° K.).

The concept of the staggered-frequency circuit shown in FIG. 1 can be extended to any number of bridges in series, with the switch frequencies being selected so that the values between the highest frequency and the lowest frequency (5 kHz and 1 kHz, for example) are divided equally among the bridges.

Figure 3:
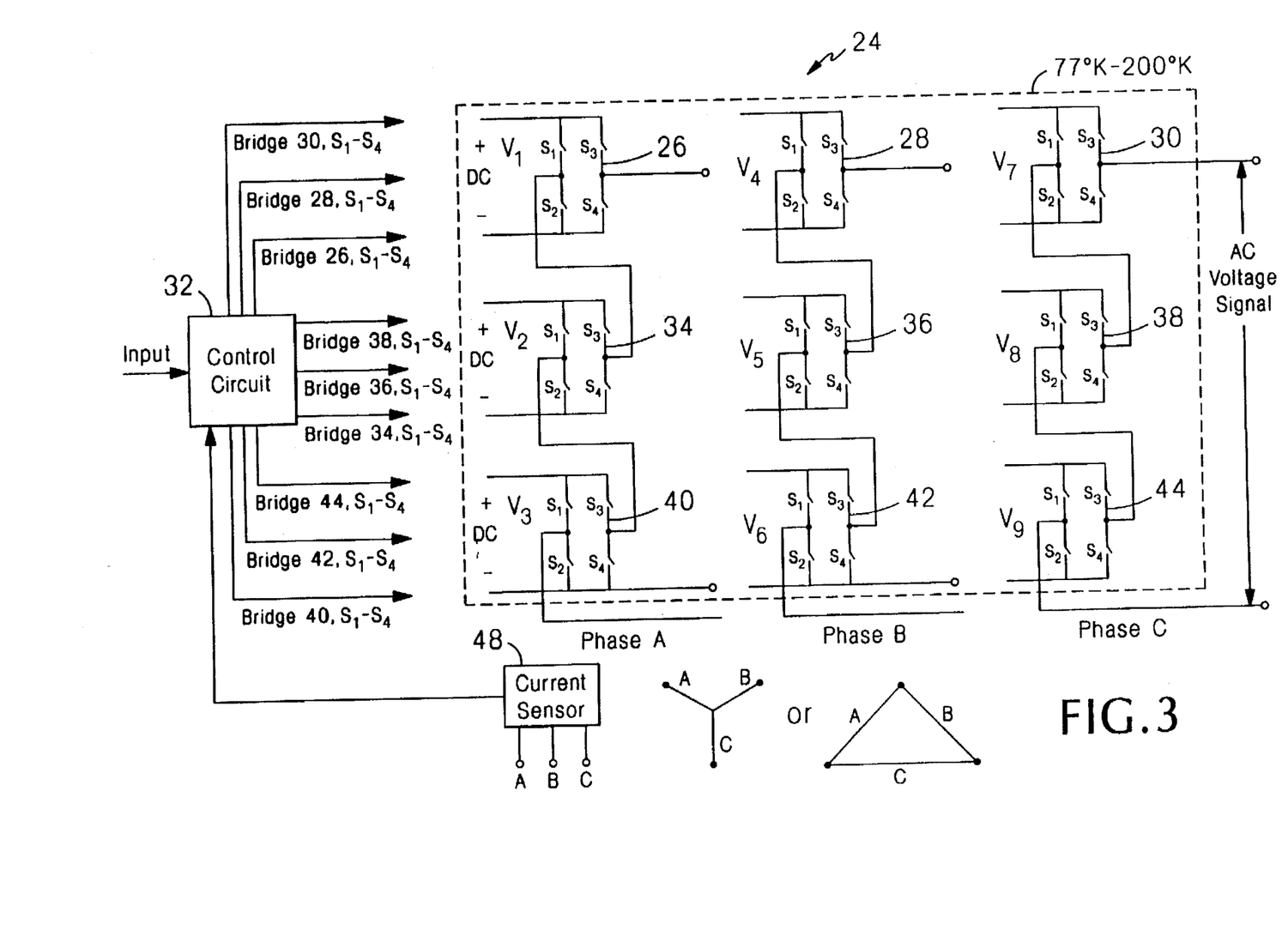
FIG. 3 is a block diagram of a three-phase staggered-voltage AC inverter or operational amplifier having series-connected full bridges in accordance with the invention.

With reference to FIG. 3, in "quasi-linear" staggered-voltage 3-phase inverter or operational amplifier 24, full bridges 26, 28, and 30 receive independent but equal DC voltage inputs of, for example, 100 V ($V_1$, $V_4$, $V_7$), and are pulse width modulated by control circuit 32 at a relatively high frequency such as 1–1000 kHz within a voltage range of −100 V to 100 V. It will be appreciated by those skilled in the art that standard filter circuits should be provided for each bridge circuit in FIG. 3 in order to filter out ripple due to pulse width modulation. Bridges 34, 36, and 38, connected in series with bridges 26, 28, and 30 respectively, receive independent but equal DC voltages $V_2$, $V_5$, $V_8$ of twice (200 V) the DC input voltage for bridges 26, 28, and 30, and the switches of bridges 34, 36, and 38 are switched by control circuit 32 sixteen times per cycle of the AC voltage signal to yield discrete output values of −200 V, 0 V, and 200 V, in a manner described below in connection with the truth table of FIG. 5. Similarly, bridges 40, 42, and 44, connected in series with bridges 34, 36, and 38 respectively, receive independent but equal DC voltages $V_3$, $V_6$, $V_9$ of three times (600 V) the DC input voltage for bridges 34, 36, and 38, and the switches of bridges 40, 42, and 44 are switched by control circuit 32 four times per cycle of the AC voltage signal to yield discrete output values of −600 V, 0 V, and 600 V, in the manner described below in connection with the truth table of FIG. 5. The AC voltage signal produced by quasi-linear 3-phase circuit 24 consists of Phase A (bridges 26, 34, and 40), Phase B (bridges 28, 36, and 42), and Phase C (bridges 30, 38, and 44), and the relationship between these phases is either a delta configuration or a Y-configuration. Control circuit 32 receives independent feedback signals for each phase from current sensor 48, which detects the current in series with the load in each phase independently, so as to ensure proper control of the AC voltage signal by control circuit 32. The phase shift between the three phase portions of the circuit is 120°.

Although in one preferred embodiment switches $S_1$–$S_4$ of each bridge are cryogenically cooled below 230° K., preferably between 77° K. and 200° K., in other embodiments the switches may operate at room temperature. Also, although only three series-connected bridges are shown in each phase portion of the circuit of FIG. 3, any number of such bridges, operating at differing staggered voltages, can be connected in series in accordance with the invention. The importance of cryogenically cooling the switches increases with the number of bridges that are connected in series as well as the number of phases of series-connected bridges.

Figure 4:
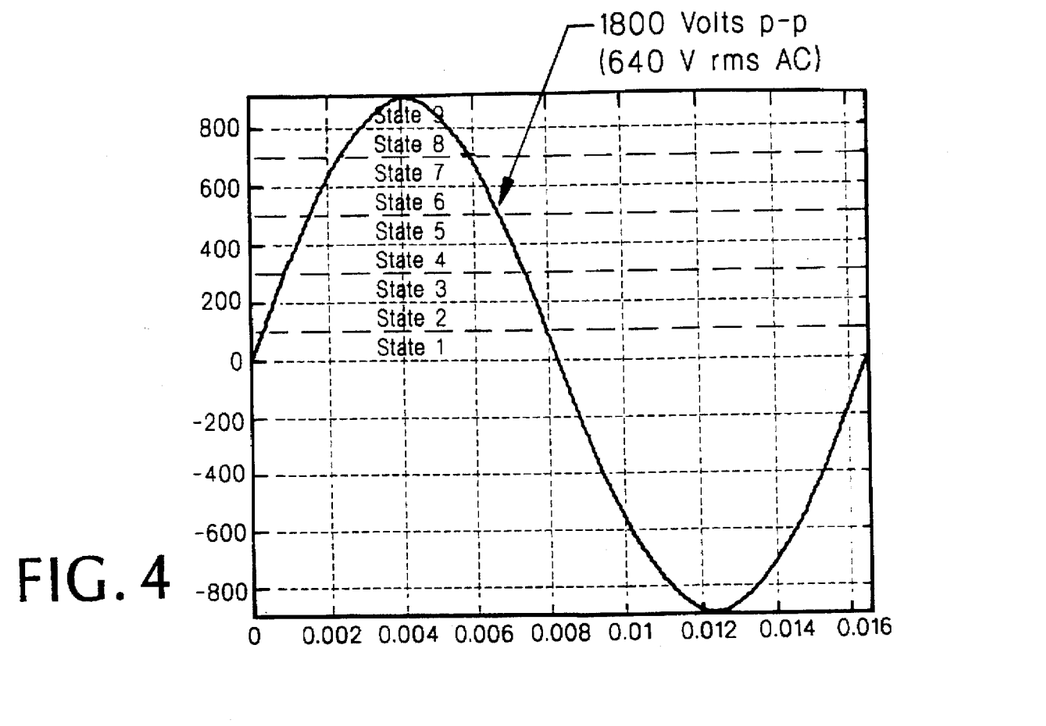
FIG. 4 is a diagram of the one phase of a voltage signal produced by a staggered-voltage circuit of the type shown in FIG. 3

FIG. 4 shows one phase of an AC voltage signal produced by a staggered-voltage circuit of the type shown in FIG. 3. If the DC input voltage for full bridges 26, 28, and 30 is 100 V, the DC input voltage for bridges 34, 36, and 38 is 200 V, and the DC input voltage for bridges 42, and 44 is 600 V, then the combined AC voltage signal is as shown, with a peak-to-peak voltage of 1800 V.

Figure 5:
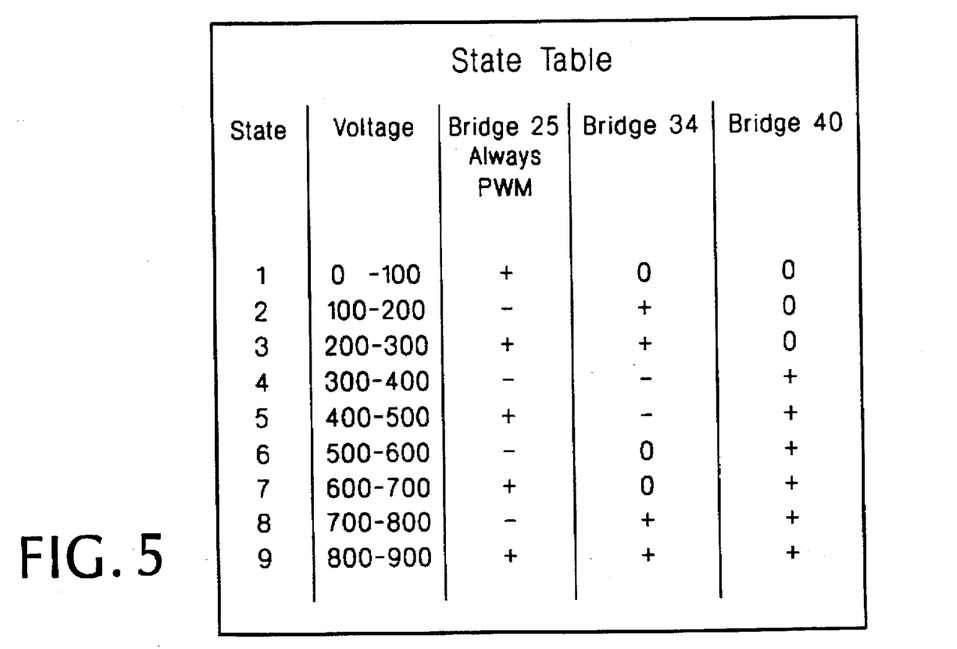
FIG. 5 is a truth table indicating the states of the switches in the series-connected full bridges forming one of the phases of a three-phase staggered-voltage AC inverter of the type shown in FIG. 3 during various portions of the AC cycle shown in FIG. 4.

The truth table of FIG. 5 shows the polarities of the various series-connected full bridges forming one of the phases of a three-phase staggered-voltage inverter of the type shown in FIG. 3. The control circuit performs pulse width modulation of bridges 26, 28, and 30 between 0 V and 100 V ("state 1" in FIG. 4), and when the AC voltage passes 100 V the polarity of these bridges is reversed to −100 V and bridges 34, 36, and 38 are switched to the 200 V state ("state 2" in FIG. 4). The output of bridges 26, 28, and 30 then proceeds from −100 V to 0 V, at which point the polarity of these bridges is reversed again ("state 3" in FIG. 4), and so on in accordance with the truth table of FIG. 5. One can synthesize any voltage from, for example, 0V to ±(100+ 200+600)V=±900V, or multiples or fractions thereof, where the higher-voltage bridges switch only at some low multiples of the low-frequency AC voltage signal. For example, in the scenario illustrated in FIGS. 4 and 5, to obtain a voltage of 760V one would select a positive polarity of bridges 40 and 34 (600 V and 200 V respectively) and would pulse width modulate bridge 26 to produce an output of −40 V, because 600+200−40=760. Similarly, to obtain a voltage of 590 V one would select a positive polarity of bridge 40 and a neutral polarity of bridge 34 and would pulse width modulate bridge 26 to produce an output of −10 V, because 600+0−10=590.

Thus, PWM high-frequency switching is replaced for 88% of the voltage range (8 of 9 states) by low-frequency switching proportional in frequency to the AC voltage signal, which may typically be in the range of 0–100 Hz. The number of switching events depends on the number of "states" and the voltage level of the AC voltage signal itself. No high-voltage switching occurs at all if the AC voltage signal is low.

The staggered-voltage circuit of FIG. 3 provides a high-voltage inverter or amplifier circuit with low switching losses due to the relatively slow rates at which bridges 34, 36, 38, 40, 42, and 44 are switched and the low voltages at which bridges 26, 28, and 30 operate. This is because switching losses are proportional not only to frequency but also to the square of the voltage across a capacitance created by switching, and the voltage across the switching capacitances in bridges 26, 28, and 30 is less than the voltage across the switching capacitances in bridges 34, 36, and 38, which is less than the voltage across the switching capacitances in bridges 40, 42, and 44. The circuit should be able to produce almost perfect sinewave currents with little or no filtering and low harmonic distortion. High-voltage (>2000 V), megawatt, 3-phase cryo-MOS inverters and amplifiers can be manufactured by combining a sufficient number of low-voltage MOSFETS (<800 V maximum) in a binary/ternary arrangement analogous to FIG. 3.

Because the nine bridges in the circuit of FIG. 3 receive nine independent DC voltages supplied by independent power supplies for each phase that are completely electrically isolated from each other, the possibility of short circuits is avoided. For example, if the phases are arranged in a Y configuration, and if $S_1$ and $S_4$ of bridge 26 are closed while $S_2$ and $S_3$ of bridge 28 are closed, the center node of the Y configuration will be connected to the positive side of one DC voltage and the negative side of another DC voltage, but there will be no short circuit because the power supplies for each phase are independent. Similarly, if the phases are arranged in a delta configuration, and if $S_1$ and $S_4$ of bridge 26 are closed while $S_2$ and $S_3$ of bridge 28 are closed, the AB node of the delta configuration will be connected to the positive side of one DC voltage and the negative side of another DC voltage, but there will be no short circuit because the power supplies for each phase are independent.

If MOSFET switches are used in the bridges, then the lowest power dissipation bridges 40, 42, and 44 need not be cooled as much as bridges 34, 36, and 38, which need not be cooled as much as bridges 26, 28, and 30. Thus, it is possible to operate bridges 40, 42, and 44 at a higher temperature level than the bridges 34, 36, and 38, which can be operated at a higher temperature than bridges 26, 28, and 30, in order to realize an improvement in overall cooling per liter of liquid nitrogen in a vapor cooling system with multiple temperature levels (all of which may be cryogenic temperature levels below about 200° K.).

Of course, other values can be used for the binary/ternary DC inputs to the bridges, such as 325 V, 650 V, and 1950 V.

In this example high-voltage IGBTs or GTOs would be used for the high-voltage (1950 V) bridges instead of the cryo-MOSFETs used for the lower-voltage bridges (the IGBTs or GTOs can be operated either at low, cryogenic temperatures or at temperatures higher than the temperature of operation of the cryo-MOSFETs). In alternative embodiments of the multiple-phase inverter or amplifier of FIG. 3 the DC voltages applied to the various bridges can be arranged in ratios other than binary/ternary, such as, for example 1:2:4:10. Alternatively, each bridge may receive the same value of DC input voltage (ratio of 1:1:1), preferably the maximum voltage permitted by available MOSFETs (approximately 650 V), where only one bridge in each phase is PWM modulated, the other bridges being switched at a low frequency proportional to the AC voltage signal in a manner similar to the scheme illustrated in FIGS. 4 and 5.

The staggered-voltage circuitry of FIG. 3 can function not only as a 3-phase AC inverter but also as a 3-phase operational amplifier that amplifies an input signal received by the control circuit. The control circuit appropriately pulse width modulates bridges 26, 28, and 30 and controls the polarities of the remaining bridges in accordance with the input signal. The modular configuration of the circuitry of FIG. 3 can be easily implemented in mass-produced, multi-chip circuits.

In an alternative embodiment linear class-AB amplifiers, controlled by the control circuit, can be substituted for bridges 26, 28, and 30 in the staggered-voltage circuitry of FIG. 3. The control circuit controls the polarities of the remaining bridges in the same manner as described above.

The scheme illustrated in FIG. 3 can be used to provide a staggered-frequency AC inverter or amplifier of the type illustrated in FIG. 1 but having multiple phases. Instead of staggering voltages $V_1$, $V_2$, and $V_3$ in each phase, frequencies $f_1$, $f_2$, and $f_3$ are staggered in the manner described above in connection with FIG. 1.

Figure 6:
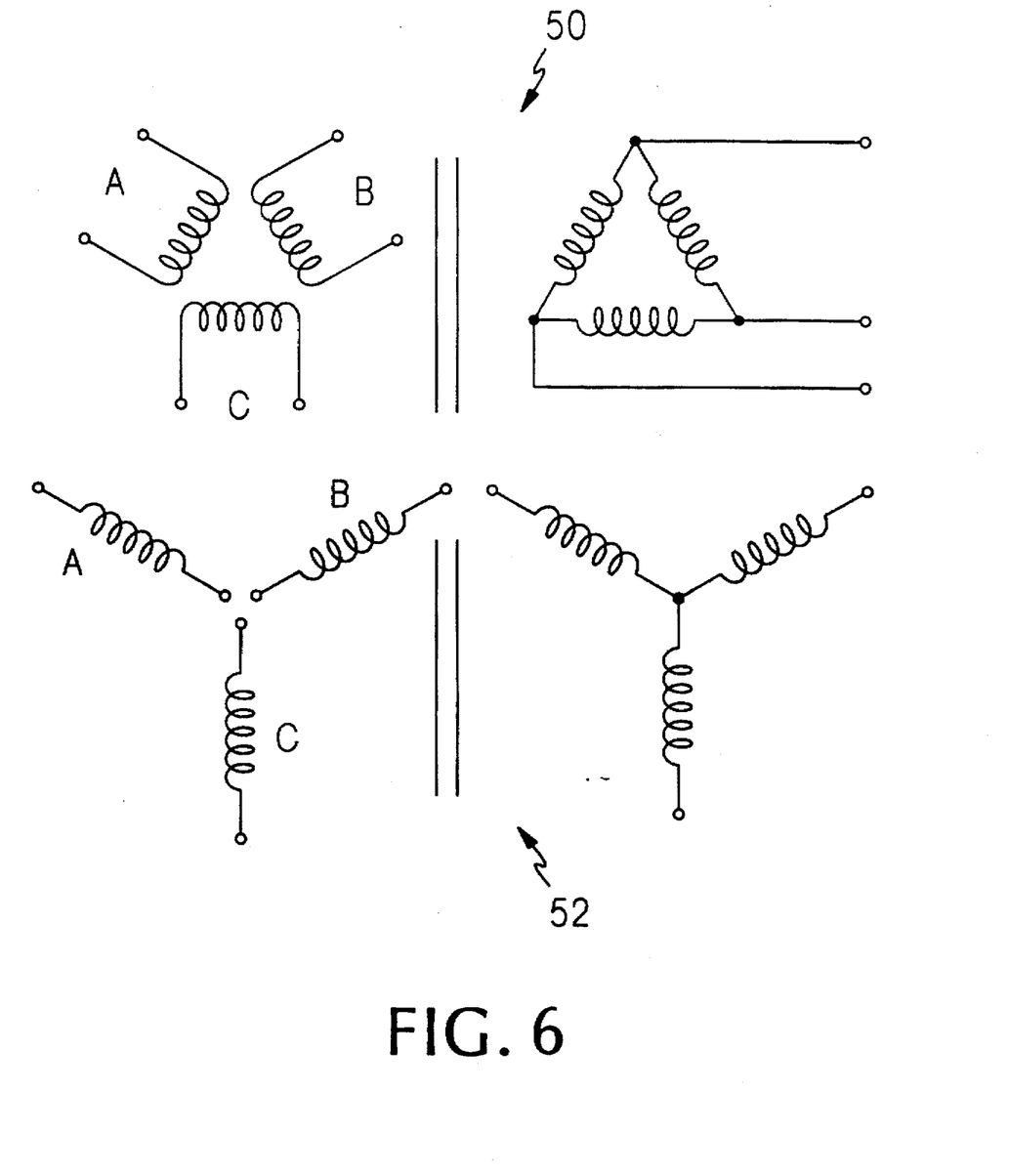
FIG. 6 is a drawing of output transformers specially designed be connected to the output AC voltage signal of a circuit of the type shown in FIG. 3.

With reference to FIG. 6, by connecting primary coils A, B, and C of delta-configuration output transformer 50 or Y-configuration output transformer 52 to the respective output voltage signals of phases A, B, and C of FIG. 3, it is possible to allow input voltages $V_1$, $V_4$, and $V_7$ to be provided by a single common power supply, input voltage $V_2$, $V_5$, and $V_8$ to be provided by a single common power supply, and input voltages $V_3$, $V_6$, and $V_8$ to be provided by a single common power supply. This is because there are no nodes that are shared between phases in the primary coils of transformer 50 or transformer 52.

There have been described novel and improved apparatus and methods for reducing switching losses in series-connected bridge inverters and amplifiers. It is evident that those skilled in the art may now make numerous uses and modifications of and departures from the specific embodiment described herein without departing from the inventive concept.

What is claimed is:

1. A staggered-frequency AC inverter or amplifier comprising:

a first pulse width modulated bridge circuit configured to receive a DC voltage and to operate at a first pulse width modulated switch frequency to generate a first output corresponding to an AC signal in a first region of the AC signal;

at least a second pulse width modulated bridge circuit connected in series with the first pulse width modulated bridge circuit and configured to receive a DC voltage and to operate at a second pulse width modulated switch frequency substantially lower than the first pulse width modulated switch frequency to generate a second output corresponding to the AC signal in a second region of the AC signal in which the AC signal changes less rapidly than in the first region, minus a maximum voltage magnitude of the first region; and pulse width modulation circuitry arranged to modulate the first pulse width modulated bridge circuit at the first pulse width modulated frequency to generate the first output when the AC signal is in the first region and to modulate the second pulse width modulated bridge circuit at the second pulse width modulated frequency to generate the second output when the AC signal is in the second region different from the first region.

2. A staggered-frequency AC inverter or amplifier in accordance with claim 1 further comprising:

a third pulse width modulated bridge circuit connected in series with the first and second pulse width modulated bridge circuits and configured to receive a DC voltage and to operate at a third pulse width modulated switch frequency substantially lower than the first and second pulse width modulated switch frequencies to generate a third output corresponding to the AC signal in a third region of the AC signal in which the AC signal changes less rapidly than in the first and second region, minus a maximum voltage magnitude of the second region.

3. A staggered-frequency inverter or amplifier in accordance with claim 2 wherein the first pulse width modulated switch frequency is approximately 5 kHz, the second pulse width modulated switch frequency is approximately 3 kHz, and the third pulse width modulated switch frequency is approximately 1 kHz.

4. A staggered-frequency inverter or amplifier in accordance with claim 2, wherein the AC signal has an rms voltage of 2600 V or less.

5. A staggered-frequency inverter or amplifier in accordance with claim 2 further comprising:

a fourth pulse width modulated bridge circuit connected in series with the first, second, and third pulse width modulated bridge circuits and configured to receive a DC voltage and to operate at a fourth pulse width modulated switch frequency substantially lower than the first, second, and third pulse width modulated switch frequencies to generate a fourth output corresponding to the AC signal in a fourth region of the AC signal in which the AC signal changes less rapidly than in the first, second, and third regions, minus a maximum voltage magnitude of the third region; and a fifth pulse width modulated bridge circuit connected in series with the first, second, third, and fourth pulse width modulated bridge circuits and configured to receive a DC voltage and to operate at a fifth pulse width modulated switch frequency substantially lower than the first, second, third, and fourth pulse width modulated switch frequencies to generate a fifth output corresponding to the AC signal in a fifth region of the AC signal in which the AC signal changes less rapidly than in the first, second, third, and fourth regions, minus a maximum voltage magnitude of the fourth region.

6. A staggered-frequency inverter or amplifier in accordance with claim 5, wherein the AC signal has an rms voltage of 4800 V or less.

7. A staggered-frequency AC inverter or amplifier in accordance with claim 1 wherein the first region of the AC signal includes a zero crossing of the AC signal.

8. A staggered-frequency AC inverter or amplifier in accordance with claim 1 wherein the first and second pulse width modulated bridge circuits comprise full bridge circuits.

9. A staggered-frequency AC inverter or amplifier in accordance with claim 1 wherein each of the first and second pulse width modulated bridge circuits comprises a plurality of MOSFET switches.

10. A staggered-frequency AC inverter or amplifier in accordance with claim 1 wherein each of the first and second pulse width modulated bridge circuits comprises a plurality of cryogenically cooled switches.

11. A staggered-frequency AC inverter or amplifier in accordance with claim 1 wherein the first pulse width modulated bridge circuit comprises a plurality of switches arranged to operate at a first, cryogenic, temperature and the second pulse width modulated bridge circuit comprises a plurality of switches arranged to operate at a second temperature that is higher than the first, cryogenic, temperature.

12. A staggered-frequency AC inverter or amplifier in accordance with claim 11 wherein the first and second temperatures are cryogenic temperatures below about 200° K.

13. A staggered-voltage multiple-phase circuit comprising:
 a first-phase portion for generating a voltage signal in a first phase, and a second-phase portion for generating the voltage signal in a second phase out of phase with the first phase, each of the first-phase and second-phase portions comprising:
 a first circuit configured to generate a first output corresponding to a plurality of segments of the voltage signal minus a corresponding plurality of constant values; and
 a second circuit comprising a full-bridge switch circuit connected in series with the first circuit and configured to receive a DC voltage and to generate a second output corresponding to at least some of the plurality of constant values, such that the sum of the first output and the second output corresponds to at least a portion of the voltage signal;
 control circuitry arranged to control the first and second circuits in the first-phase and second-phase portions so as to cause the first and second circuits to generate the first and second outputs respectively; and
 independent and isolated power supplies connected to each first and second circuit in each of the first-phase and second-phase portions to supply DC voltage to the first and second circuits of the first-phase and second-phase portions.

14. A staggered-voltage multiple-phase circuit in accordance with claim 13, further comprising a third-phase portion for generating the voltage signal in a third phase out of phase with the first and second phases, the third-phase portion comprising:
 a first circuit configured to receive a DC voltage and to generate a first output corresponding to a plurality of segments of the voltage signal minus a corresponding plurality of constant values; and
 a second circuit comprising a full-bridge switch circuit connected in series with the first circuit and configured to receive a DC voltage and to generate a second output corresponding to at least some of the plurality of constant values, such that the sum of the first output and the second output corresponds to at least a portion of the voltage signal.

15. A staggered-voltage multiple-phase circuit in accordance with claim 13, wherein each of the first-phase and second-phase portions further comprises:
 a third circuit comprising a full-bridge switch circuit connected in series with the first and second circuits, configured to receive a DC voltage and to generate a third output corresponding to at least some of the plurality of constant values, such that the sum of the first, second, and third outputs corresponds to at least a portion of the voltage signal.

16. A staggered-voltage multiple-phase circuit in accordance with claim 15, wherein second output includes a constant value that is approximately twice the maximum value of the first output, and the third output includes a constant value that is approximately three times the constant value that is approximately twice the maximum value of the first output.

17. A staggered-voltage multiple-phase circuit in accordance with claim 15, wherein the second and third outputs include a constant value that is approximately the same as the maximum value of the first output first, second, and third circuits produce first, second, and third outputs in a ratio of 1:1:1.

18. A staggered-voltage multiple-phase circuit in accordance with claim 13, wherein the first circuit comprises a pulse width modulated full-bridge switch circuit configured to receive a DC voltage and to operate at a pulse width modulated switch frequency.

19. A staggered-voltage multiple-phase circuit in accordance with claim 18, wherein the pulse width modulated switch frequency is approximately 1–1000 kHz.

20. A staggered-voltage multiple-phase circuit in accordance with claim 18, wherein the first circuit comprises a plurality of MOSFET switches.

21. A staggered-voltage multiple-phase circuit accordance with claim 20, wherein the second circuit comprises a plurality of MOSFET switches.

22. A staggered-voltage multiple-phase circuit accordance with claim 21 wherein the MOSFET switches are cryogenically cooled.

23. A staggered-voltage multiple-phase circuit in accordance with claim 20, wherein the second circuit comprises a plurality of high-voltage IGBT or GTO switches.

24. A staggered-voltage multiple-phase circuit in accordance with claim 23 wherein the IGBT or GTO switches are cryogenically cooled.

25. A staggered-voltage multiple-phase circuit in accordance with claim 13, wherein the first circuit comprises a linear class-AB amplifier.

26. A staggered-voltage multiple-phase circuit in accordance with claim 13 wherein the multiple-phase circuit is an AC inverter and the voltage signal generated by the first-phase and second-phase portions comprises a predetermined AC signal.

27. A staggered-voltage multiple-phase circuit in accordance with claim 13 wherein the multiple-phase circuit is an amplifier circuit and the voltage signal generated by the first-phase and second-phase portions comprises an amplification of an input signal.

28. A staggered-voltage multiple-phase circuit in accordance with claim 13 wherein the first circuit in the first-phase and second-phase portions comprises a plurality of switches arranged to operate at a first, cryogenic, temperature and the second circuit in the first-phase and second-phase portions comprises a plurality of switches arranged to operate at a second temperature that is higher than the first, cryogenic, temperature.

29. A staggered-voltage multiple-phase circuit in accordance with claim 28 wherein the first and second temperatures are cryogenic temperatures below about 200° K.

30. A staggered-voltage multiple-phase circuit comprising:

a first-phase portion for generating a voltage signal in a first phase, and a second-phase portion for generating the voltage signal in a second phase out of phase with the first phase, each of the first-phase and second-phase portions comprising:

a first circuit configured to generate a first output corresponding to a plurality of segments of the voltage signal minus a corresponding plurality of constant values; and a second circuit comprising a full-bridge switch circuit connected in series with the first circuit and configured to receive a DC voltage and to generate a second output corresponding to at least some of the plurality of constant values, such that the sum of the first output and the second output corresponds to at least a portion of the voltage signal;

control circuitry arranged to control the first and second circuits in the first-phase and second-phase portions so as to cause the first and second circuits to generate the first and second outputs respectively; and an output transformer having first and second independent and isolated primary coils connected to respective outputs of the first-phase and second-phase portions to receive the voltage signal in the first phase generated by the first-phase portion and to receive the voltage signal in the second phase generated by the second-phase portion.

31. A staggered-frequency multiple-phase circuit comprising:

a first-phase portion for generating a voltage signal in a first phase, and a second-phase portion for generating the voltage signal in a second phase out of phase with the first phase, each of the first-phase and second-phase portions comprising:

a first pulse width modulated bridge circuit configured to receive a DC voltage and to operate at a first pulse width modulated switch frequency to generate a first output corresponding to an AC signal in a first region of the AC signal;

at least a second pulse width modulated bridge circuit connected in series with the first pulse width modulated bridge circuit and configured to receive a DC voltage and to operate at a second pulse width modulated switch frequency substantially lower than the first pulse width modulated switch frequency to generate a second output corresponding to the AC signal in a second region of the AC signal in which the AC signal changes less rapidly than in the first region, minus a maximum voltage magnitude of the first region; and pulse width modulation circuitry arranged to modulate the first pulse width modulated bridge circuit in the first-phase and second-phase portions at the first pulse width modulated frequency to generate the first output when the AC signal is in the first region and to modulate the second pulse width modulated bridge circuit in the first-phase and second-phase portions at the second pulse width modulated frequency to generate the second output when the AC signal is in the second region different from the first region; and independent and isolated power supplies connected to each first and second pulse width modulated bridge circuit in each of the first-phase and second-phase portions to supply DC voltage to the first and second pulse width modulated bridge circuits of the first-phase and second-phase portions.

32. A staggered-frequency multiple-phase circuit comprising:

a first-phase portion for generating a voltage signal in a first phase, and a second-phase portion for generating the voltage signal in a second phase out of phase with the first phase, each of the first-phase and second-phase portions comprising:

a first pulse width modulated bridge circuit configured to receive a DC voltage and to operate at a first pulse width modulated switch frequency to generate a first output corresponding to an AC signal in a first region of the AC signal;

at least a second pulse width modulated bridge circuit connected in series with the first pulse width modulated bridge circuit and configured to receive a DC voltage and to operate at a second pulse width modulated switch frequency substantially lower than the first pulse width modulated switch frequency to generate a second output corresponding to the AC signal in a second region of the AC signal in which the AC signal changes less rapidly than in the first region, minus a maximum voltage magnitude of the first region; and pulse width modulation circuitry arranged to modulate the first pulse width modulated bridge circuit in the first-phase and second-phase portions at the first pulse width modulated frequency to generate the first output when the AC signal is in the first region and to modulate the second pulse width modulated bridge circuit in the first-phase and second-phase portions at the second pulse width modulated frequency to generate the second output when the AC signal is in the second region different from the first region; and an output transformer having first and second independent and isolated primary coils connected to respective outputs of the first-phase and second-phase portions to receive the voltage signal in the first phase generated by the first-phase portion and to receive the voltage signal in the second phase generated by the second-phase portion.

* * * * *